W. A. HEANEY, DEC'D.
E. M. HEANEY, ADMINISTRATRIX.
CLUTCH.
APPLICATION FILED NOV. 2, 1915.

1,248,110.

Patented Nov. 27, 1917.
2 SHEETS—SHEET 1.

ETHEL M. HEANEY,
ADMINISTRATRIX OF W.A. HEANEY,
DECEASED, INVENTOR.

By Hull, Smith, Brock & West
ATTYS.

W. A. HEANEY, DEC'D.
E. M. HEANEY, ADMINISTRATRIX.
CLUTCH.
APPLICATION FILED NOV. 2, 1915.
1,248,110.
Patented Nov. 27, 1917.
2 SHEETS—SHEET 2.
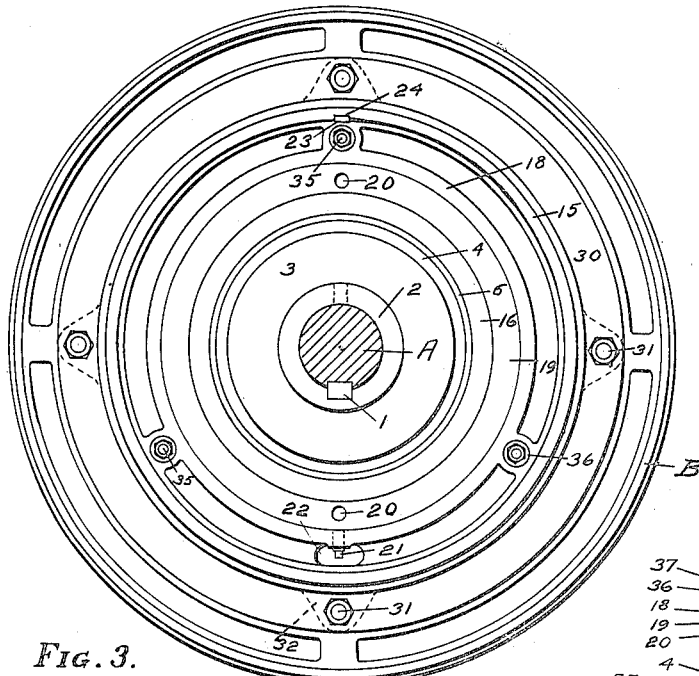
FIG. 3.
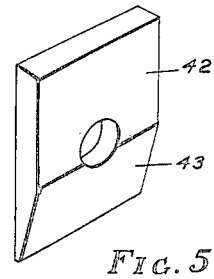
FIG. 5.
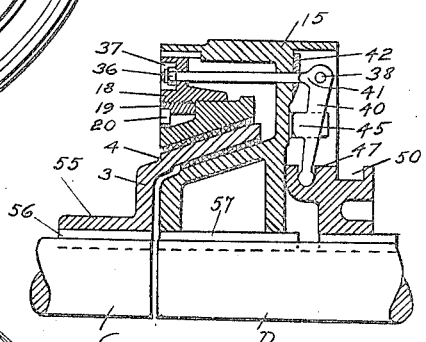
FIG. 8.
FIG. 4.
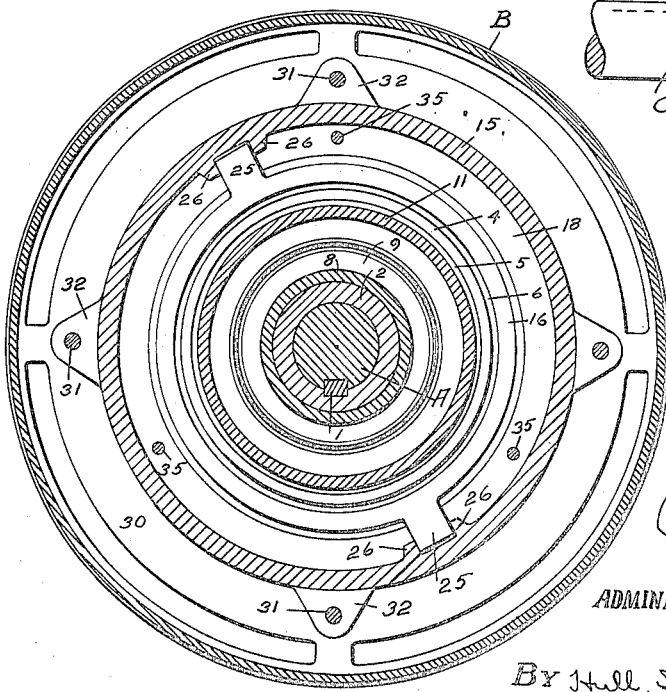
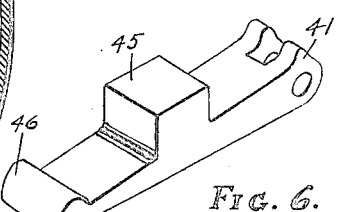
FIG. 6.
ETHEL M. HEANEY,
ADMINISTRATRIX OF W.A. HEANEY,
DECEASED, INVENTOR.
By Hull, Smith, Brock & West
ATTYS.

UNITED STATES PATENT OFFICE.

WILLIAM A. HEANEY, DECEASED, LATE OF AKRON, OHIO, BY ETHEL M. HEANEY, ADMINISTRATRIX, OF BETHESDA, OHIO, ASSIGNOR, BY DIRECT AND MESNE ASSIGNMENTS, TO WILLIAM F. WARDEN, OF CUYAHOGA FALLS, OHIO.

CLUTCH.

1,248,110.   Specification of Letters Patent.   Patented Nov. 27, 1917.

Application filed November 2, 1915. Serial No. 59,174.

*To all whom it may concern:*

Be it known that WILLIAM A. HEANEY, deceased, late a citizen of the United States, residing at Akron, in the county of Summit and State of Ohio, invented certain new and useful Improvements in Clutches, of which the following is a specification, reference being had to the accompanying drawings.

This invention relates to improvements in clutches, and more particularly to improvements in so called dry clutches, especially of the cone type, and wherein no oil or grease is required further than the lubricant embodied in the material from which the friction surfaces are made.

The invention has for its objects the provision of a clutch of the aforesaid general character that is highly efficient and very compact, the same occupying little space longitudinally of the shaft whereon it is mounted; to provide a clutch that is very durable; that is economical of maintenance; wherein there is a universal adjustment between the clutch faces so that all parts of adjacent clutch faces may be uniformly and simultaneously adjusted toward and from each other, especially for the purpose of compensating for wear; to provide a friction clutch wherein the clutch face linings may be easily and cheaply replaced; and to provide a clutch of the nature above set forth that may be incorporated within a pulley, or used as a coupling between shaft sections; and further to provide a clutch wherein either side may be the driving or driven element.

Figure 1:
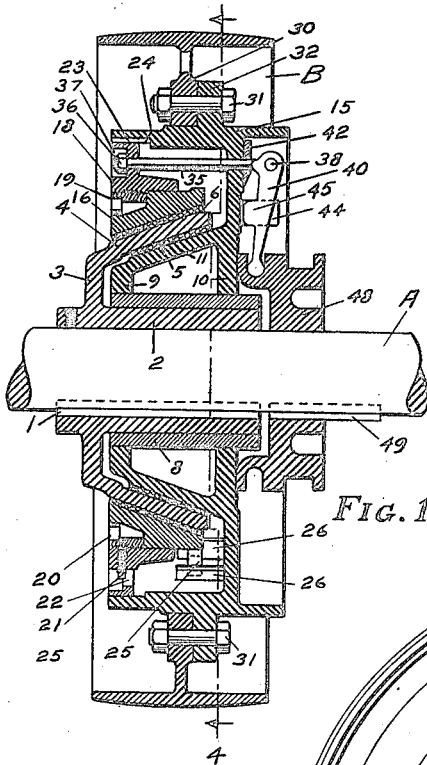
Figure 7:
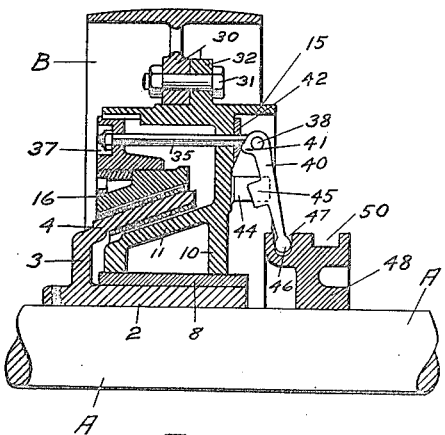
Figure 2:
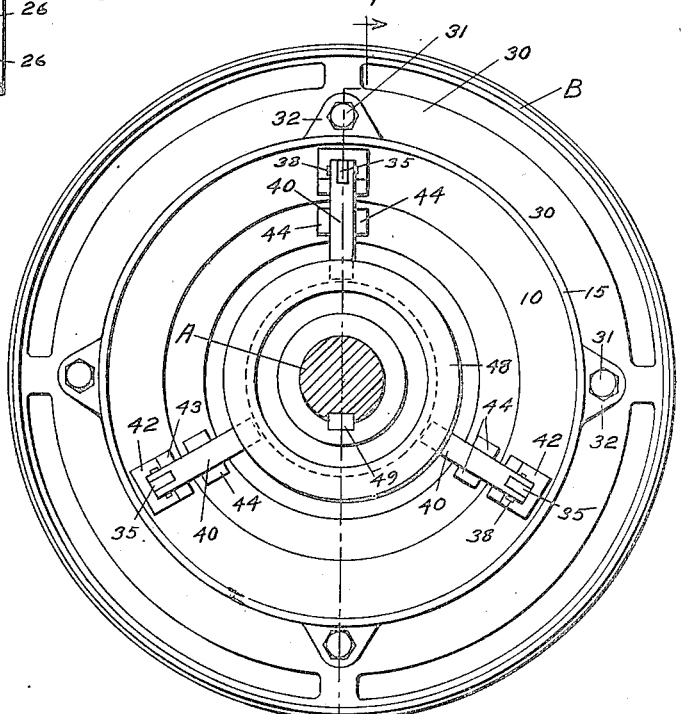

To the attainment of these ends, the invention consists of the combinations of elements set forth in the annexed claims and illustrated in the accompanying drawings which form a part hereof, and wherein Figure 1 is a central section through a clutch of my invention, the same being taken substantially on the line 1—1 of Fig. 2; Fig. 2 is a right hand side elevation of the clutch shown in Fig. 1; Fig. 3 is an opposite side elevation thereof; Fig. 4 is a section on the line 4—4 of Fig. 1; Fig. 5 is a detail in perspective of one of a series of bearing plates used in my clutch; Fig. 6 is a similar view of one of the cam or bell-crank levers which coöperates with the aforesaid bearing plate; Fig. 7 is a view, similar to Fig. 1, showing the clutch in ineffective position, the lower half of the clutch being omitted from this figure for the obvious purpose of saving space; and Fig. 8 is a fragmentary section of a modified form of my clutch.

As previously explained, either side of the clutch may be the driver, and for the purpose of description I will assume that the shaft A is the driving element and that it has secured to it the driving member of the clutch. The pulley B, therefore, will be considered the driven element, and is shown as fastened to the driven member of the clutch. Secured to the shaft A, as by means of a key 1, is a sleeve portion 2 of what I will term the intermediate clutch member 3, the same comprising, in addition to said sleeve, an annular wall to which the numeral 3 is applied, and a frusto-conical shell 4 which extends out over the sleeve 2, the same diverging from the wall 3. Secured to the inner and outer faces of the shell 4 are liners 5 and 6 respectively, which may be made of any suitable friction material, preferably of a material known to the trade as "Raybestos."

An oilless bushing 8 is mounted to turn upon the sleeve 2, and this bushing preferably contains a dry lubricant which obviates the need of oil. Fitting upon the bushing 8 at a driving fit are the inner peripheries of the annular walls 9 and 10 of what I will term my inner clutch member 11, the same comprising a frusto-conical section to which the numeral 11 is applied, and which is of substantially the same taper as the shell 4. The outer surface of the section 11 coöperates with the inner face of the shell or, correctly speaking, with the liner 5 thereof. The section 11 is supported at its opposite ends by the aforesaid walls 9 and 10, the same being preferably formed integral therewith, and the latter wall extends some distance beyond the periphery of the conical section 11. This wall 10 has formed about its edge a cylindrical flange 15. The flange 15 extends in one direction from the wall 10 out over the shell 4, and located between the flange and shell is my composite outer clutch member, the outer clutch member proper being designated 16, and having an inner frusto-conical face that corresponds in inclination to the shell 4, and is adapted to coöperate with the liner 6 thereor. It will be observed that a portion of the outer surface of the clutch member 16 is cylindrical, and an annulus 18 is adapted to be adjusted along the cylindrical portion of said clutch member by an adjusting ring 19, said annulus and ring having coöperating threaded portions. The inner end of the adjusting ring bears against a shoulder that is formed between the cylindrical surface and the outer tapered surface of the clutch member 16, and said ring is adapted to be turned by a suitable instrument, such as a spanner wrench, the ring being provided with suitable apertures 20 for the application of such wrench. The adjusting ring and annulus are adapted to be held against relative movement, thereby to retain their proper adjustment against accidental alteration, by means of a set screw 21 that is threaded radially through the annulus and bears against the threaded portion of the adjusting ring, the screw 21 occupying a recess 22 in the annulus, where it is protected against being inadvertently loosened, and where it is safe from interference with articles moved in proximity to the clutch.

The outer periphery of the annulus coöperates with a smooth portion of the flange 15, and is adapted to move therealong during the operation of the clutch; and to prevent the annulus from turning with respect to the flange, the same is provided with a spline 23 which coöperates with a feather 24 of the flange. A pair of lugs 25 extend radially from the larger end of the outer clutch member 16, and are reciprocable between parallel ribs 26 that are formed on the inner side of the flange 15. This provides a substantial connection between the inner and outer clutch members, the same allowing said members to move toward and from each other but effectively holding them against relative rotation.

The pulley B is formed with a central web 30 that is connected, by bolts 31, to lugs 32 which radiate from the flange 15.

35 are I-bolts which extend through alining apertures in the annulus 18 and the wall 10, the eyes of the bolts being located to the right of said wall (as viewed in Figs. 1 and 7) and within the scope of that portion of the flange 15 which protrudes, in the aforesaid direction, beyond the wall 10. The flange thus serves to protect the eyes, and parts associated therewith, while the opposite ends of the bolts and the nuts 36 applied thereto are housed within cavities 37 of the annulus. Pins 38 extend through the eyes of the bolts and through the opposed forks of the difracted ends of bell-crank levers 40. The shorter branches of the levers 40 constitute noses 41 which engage bearing plates 42 that are perforated to receive the bolts 35 and are interposed between said levers and the wall 10. The plates are prevented from turning to any material degree upon the bolts by the engagement of their outer straight edges with the inner surfaces of the flange 15. It will be observed, especially from Fig. 5, that the inner ends of the bearing plates 42 are tapered, as shown at 43, the tapered portion of each plate extending upward nearly to the transverse center of the plate. In order to retain the levers 40 in their proper position or substantially radial with respect to the inner clutch member, the levers are each confined between a pair of stout lugs 44 which extend from the wall 10. The portion of each lever which operates between the aforesaid lugs is increased in width, as shown at 45, so that when the levers are in their extreme outer position, the portions 45 are still confined between the lugs 44, it being essential that the length of the lugs 44 should not be greater than depth of that portion of the flange 15 which extends toward the right from the wall 10. The inner ends of the levers 40 are provided with transverse, cylindrical enlargements 46 which occupy a circumferential groove 47 in a shifting sleeve 48, that is slidable upon a shaft A, and that is secured against rotation with respect thereto by means of the key 49. The shifting collar is grooved at 50 for the application of the usual split collar whereby the sleeve is swiveled to a suitable shifting fork. These parts are common and it is deemed unnecessary to illustrate them.

From the foregoing construction it will be understood that when the shifting sleeve 48 is pushed inward against the wall 10 of the inner clutch member, the bell crank levers 40 will be rocked upon the pins 38, causing the noses 41 of the levers to ride up the inclined portions 43 of the bearing plates 42, thereby drawing the inner and outer clutch members toward each other to effectively clamp between them the intermediate clutch member 4. Attention is called to the fact that, when in effective position, the noses of the levers 40 bear upon straight portions of the bearing plates 42, coincident with or slightly above the centers of the bolts 35, thus positively locking the inner and outer clutch members against separation. The ease with which the foregoing operation may be accomplished will be appreciated when the difference in the lengths of the two branches of the bell crank levers is taken into consideration. Besides this leverage, the principle of the wedge or inclined plane is involved, which, as is well understood, is an effectual means of increasing power. When the foregoing operation is reversed, the parts may assume the position shown in Fig. 7, when the driving member is free to rotate independently of the driven member. To adjust the clutch, the set screw 21 is loosened, and a spanner wrench is applied to the adjusting ring 19. By turning the ring in the appropriate direction it will feed the inner clutch member toward the intermediate clutch member, independently of the annulus 18, and the parts may then be locked in such position by the set screw 21.

I consider the adjustment just described a very important feature of my invention since, by means of an adjustment of this character, all parts of the adjusted clutch member are affected in precisely the same way and are moved uniformly and simultaneously.

In Fig. 8 I have illustrated a modification of my invention that is shown as a coupling between sections C and D of a shaft. In this form the sleeve 55 of the intermediate clutch member extends in a direction opposite to that in which the sleeve of the former modification extends, and this sleeve is secured against rotation on the shaft section C by means of a key 56. The inner clutch member is held against rotation on the shaft section D by means of the key 57. In all other respects, this form of my clutch is precisely the same as that shown in the preceding figures with the exception that the pulley is omitted for the reason that, in the present instance, the clutch is used as a coupling. Because of the similarity between the two forms of my invention, the same reference numerals will be applied to the corresponding parts of both.

Having thus described my invention, what I claim is:—

1. The combination with a driving and a driven element, of a pair of clutch members non-rotatable with respect to one element, a clutch member intermediate the former clutch members and non-rotatable with respect to the other element, a ring, a member through which said ring has a screw thread adjustment between itself and one clutch member of the aforesaid pair, and means connected to said ring to effect a movement toward and from each other of the pair of clutch members.

2. The combination with a driving and a driven element, of a pair of clutch members non-rotatable with respect to one element, a clutch member intermediate the former clutch members and non-rotatable with respect to the other element, one of the clutch members of the aforesaid pair having an annular shoulder that is in a plane transverse the direction of movement of said clutch member, an annulus that is movable transversely across the periphery of the last mentioned clutch member, said annulus having a threaded portion, an adjusting ring having a threaded portion for coöperation with the threaded portion of the annulus and having engagement with the aforesaid shoulder of the clutch member, draw bolts having connection with the annulus and extending beyond the other clutch member of the aforesaid pair, cam members pivotally connected to the draw bolts beyond the last mentioned clutch member and operating between said clutch member and their pivotal connections with the draw bolts thereby to draw the clutch members of the aforesaid pair into engagement with the intermediate clutch member when the cam members are moved in one direction, and thereby to permit said clutch members to separate when moved in the opposite direction, and means for moving said cam members.

3. The combination with a driving and a driven element, of a pair of clutch members non-rotatable with respect to one element, a clutch member intermediate the former clutch members and non-rotatable with respect to the other element, the clutch members of the aforesaid pair having coöperating portions whereby they are held against angular movement with respect to each other, an adjusting ring that engages one clutch member of the aforesaid pair and is rotatable with respect thereto, an annulus non-rotatable but movable with respect to the last mentioned clutch member, the adjusting ring and annulus having coöperating threaded portions whereby the annulus may be adjusted with respect to the last mentioned clutch member by means of the aforesaid ring, the other clutch member of the aforesaid pair having a wall that is opposed to the annulus, draw bolts having connection with the annulus and extending beyond the aforesaid wall, cam levers pivoted to said draw bolts beyond the last mentioned wall, said cam members acting between their pivotal connections with said bolts and the aforesaid wall to move the pair of clutch members toward and from each other when said levers are oscillated, and means for oscillating said levers.

4. The combination with a driving and a driven element, of a pair of clutch members non-rotatable with respect to one element, a clutch member intermediate the former clutch members and non-rotatable with respect to the other element, the clutch members of the aforesaid pair having coöperating portions whereby they are held against angular movement with respect to each other, an adjusting ring that engages one clutch member of the aforesaid pair and is rotatable with respect thereto, an annulus non-rotatable but movable with respect to the last mentioned clutch member, the adjusting ring and said annulus having coöperating threaded portions whereby the annulus may be adjusted with respect to the last mentioned clutch member by means of the aforesaid ring, means for locking the annulus and the ring against relative movement, the other clutch member of the aforesaid pair having a wall that is opposed to the annulus, draw bolts having connection with the annulus and extending through the aforesaid wall, and levers pivoted to said draw bolts beyond the last mentioned wall, said cam members acting between their pivotal connections with said bolts and the aforesaid wall to move the pair of clutch members toward and from each other when said levers are oscillated, and means for oscillating said levers.

5. The combination with a driving and a driven element, of a pair of clutch members non-rotatable with respect to one element, a clutch member intermediate the former clutch members and non-rotatable with respect to the other element, an adjusting ring engaging the first clutch member of the aforesaid pair and rotatable with respect thereto, an annulus non-rotatable but movable with respect to said first clutch member, the adjusting ring and said annulus having coöperating threaded portions whereby the annulus may be adjutsed with respect to the said clutch member by means of the ring, the clutch members of the pair having coöperating portions whereby they are held against relative angular movement, the second of the aforesaid pair of clutch members having a wall opposed to the annulus, draw bolts having connection with the annulus and extending through the aforesaid wall, bearing plates surrounding the bolts on the side of the aforesaid wall remote from the annulus, bell crank levers pivotally connected to the draw bolts adjacent the aforesaid plates and having one of their branches engaging said plates, and means movable longitudinally of the rotating axis of the clutch members for coöperation with the opposite branches of the bell crank levers, thereby to oscillate them, as and for the purpose specified.

6. The combination with a driving and a driven element, one of said elements consisting of a shaft, of a clutch member comprising a sleeve and a conical shell that overhangs said sleeve, the smaller end of the shell having connection with one end of the sleeve, said sleeve being mounted upon the shaft, an inner clutch member rotatable upon the aforesaid sleeve and having a frusto-conical portion for engagement with the inner side of the aforesaid shell, the inner clutch member having also a wall that extends beyond the periphery of the larger end of the shell, of an outer clutch member having a frusto-conical inner surface for coöperation with the outer surface of the aforesaid shell, the inner and outer clutch members having coöperating portions whereby they are held against relative annular movement, an adjusting ring engaging and rotatable with respect to the outer clutch member, an annulus non-rotatable but movable with respect to the outer clutch member, means locking said annulus against rotation with respect to the inner clutch member, the annulus and aforesaid ring having coöperating threaded portions whereby said annulus may be adjusted with respect to the outer clutch member by means of said ring, draw bolts having connection with the annulus and extending through apertures in the aforesaid wall of the inner clutch member, bearing plates surrounding said bolts and engaging the side of the wall remote from the annulus, bell crank levers having pivotal connection with the draw bolts, one branch of the aforesaid levers coöperating with the bearing plates, and a shifting collar slidable upon the aforesaid shaft and operatively connected to the other branch of the aforesaid bell-crank levers.

7. The combination with a driving and a driven element, one of said elements consisting of a shaft, of an itnermediate clutch member comprising a sleeve and a frusto-conical shell overhanging said sleeve and having connection therewith at its smaller end, said sleeve being mounted upon the shaft, bushing mounted upon the sleeve, an inner clutch member rotatable upon said bushing and having a frusto-conical portion for coöperation with the inner surface of the aforesaid shell, the inner clutch member having also a wall that extends beyond the periphery of its larger end, an outer clutch member having a frusto-conical inner surface for coöperation with the outer surface of the aforesaid shell, liners of friction material between the adjacent surfaces of the clutch members, an adjusting ring engaging and rotatable with respect to the outer clutch member, an annulus carried by the outer clutch member and movable but non-rotatable with respect thereto, the annulus and the aforesaid adjusting ring having coöperating threaded portions whereby the annulus may be adjusted with respect to the outer clutch member by means of said ring, the inner clutch member having a peripheral cylindrical flange which is carried by the aforesaid wall and overhangs the annulus, means locking the annulus against rotation with respect to the flange, the inner and outer clutch members having coöperating portions whereby they are held against relative angular movement, draw bolts having connection with the annulus and extending through apertures in the aforesaid wall, the bolts being provided therebeyond with eyes, a bell crank lever pivoted to the eye of each bolt and having a nose which constitutes one branch of the lever, a bearing plate that surrounds each bolt and is interposed between the aforesaid wall and the nose of the adjacent bell crank lever, said plate having a surface that is perpendicular to the bolt adjacent the bolt and a portion that is inclined inwardly therefrom and toward said wall, a pair of lugs extending from the side of the aforesaid wall between which the other branch of each of the bell crank levers is adapted to oscillate, thereby to maintain the levers radial with respect to the inner clutch member, and a sleeve slidable upon a shaft and having a circumferential groove within which the free ends of the last mentioned branches of the bell crank levers repose, the above mentioned cylindrical flange encompassing the aforesaid bell crank levers and projections.

8. The combination with a driving and a driven element, one of said elements consisting of a shaft, of an intermediate clutch member comprising a sleeve and a frusto-conical shell overhanging the sleeve and having connection therewith at its smaller end, said sleeve being mounted upon the shaft, a bushing mounted upon the sleeve, an inner clutch member rotatable upon said bushing and having a frusto-conical portion for coöperation with the inner surface of the aforesaid shell, an outer clutch member having a frusto-conical inner surface for coöperation with the outer surface of the shell, liners of friction material between adjacent faces of the clutch members, and mechanism for moving the inner and outer clutch members toward and from the intermediate clutch members.

In testimony whereof I hereunto affix my signature this 12 day of October, 1915.

ETHEL M. HEANEY,
*Administratrix of the estate of William A. Heaney, deceased.*

Witnesses:
  Mrs. PAUL ARMSTRONG,
  PAUL ARMSTRONG.